G. O. CROSSLAND.
FERTILIZING ATTACHMENT FOR PLANTERS.
APPLICATION FILED NOV. 7, 1917.

1,257,459.

Patented Feb. 26, 1918.

G. O. Crossland, Inventor,

Witness

By C. A. Snow & Co.

Attorneys.

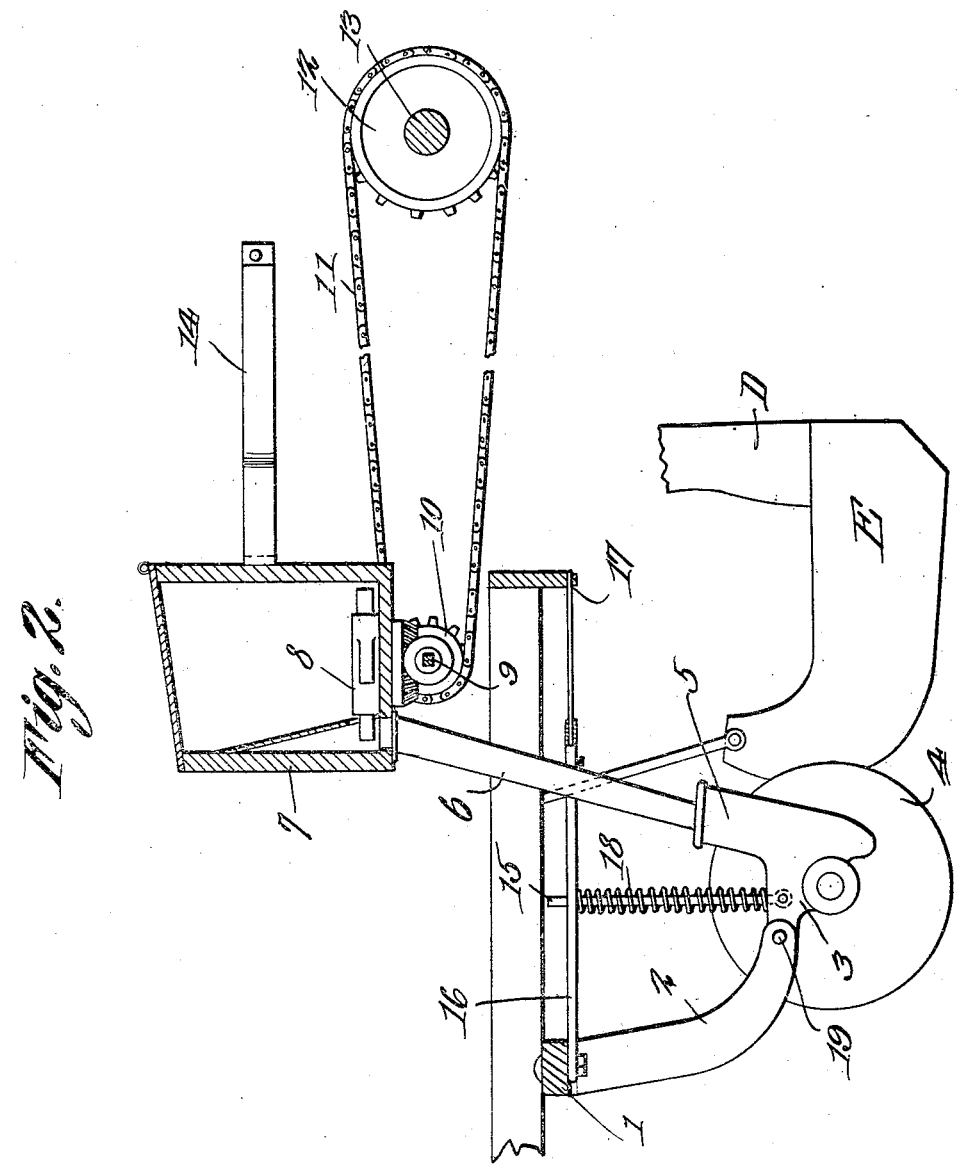

UNITED STATES PATENT OFFICE.

GEORGE O. CROSSLAND, OF PLEASANT LAKE, INDIANA.

FERTILIZING ATTACHMENT FOR PLANTERS.

1,257,459.　　　Specification of Letters Patent.　　Patented Feb. 26, 1918.

Application filed November 7, 1917. Serial No. 200,761.

*To all whom it may concern:*

Be it known that I, GEORGE O. CROSSLAND, a citizen of the United States, residing at Pleasant Lake, in the county of Steuben and State of Indiana, have invented a new and useful Fertilizing Attachment for Planters, of which the following is a specification.

This invention relates to a fertilizer attachment for planters, one of the objects of the invention being to provide a device of this character which can be readily applied to a planter and which will deposit fertilizer in the ground along continuous rows extending at opposite sides of the hills so that the fertilizer will not be dropped in quantities in each hill, as has heretofore been done generally but will, instead, be deposited at two points beyond each side of each hill and also along lines between the hills, thereby insuring proper nourishment for the planted seeds at all times without causing injury to the seeds because of their direct contact with the fertilizer.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—

Fig. 2 is a view partly in section and partly in elevation of the attachment and adjacent parts of the planter.

Figure 1:
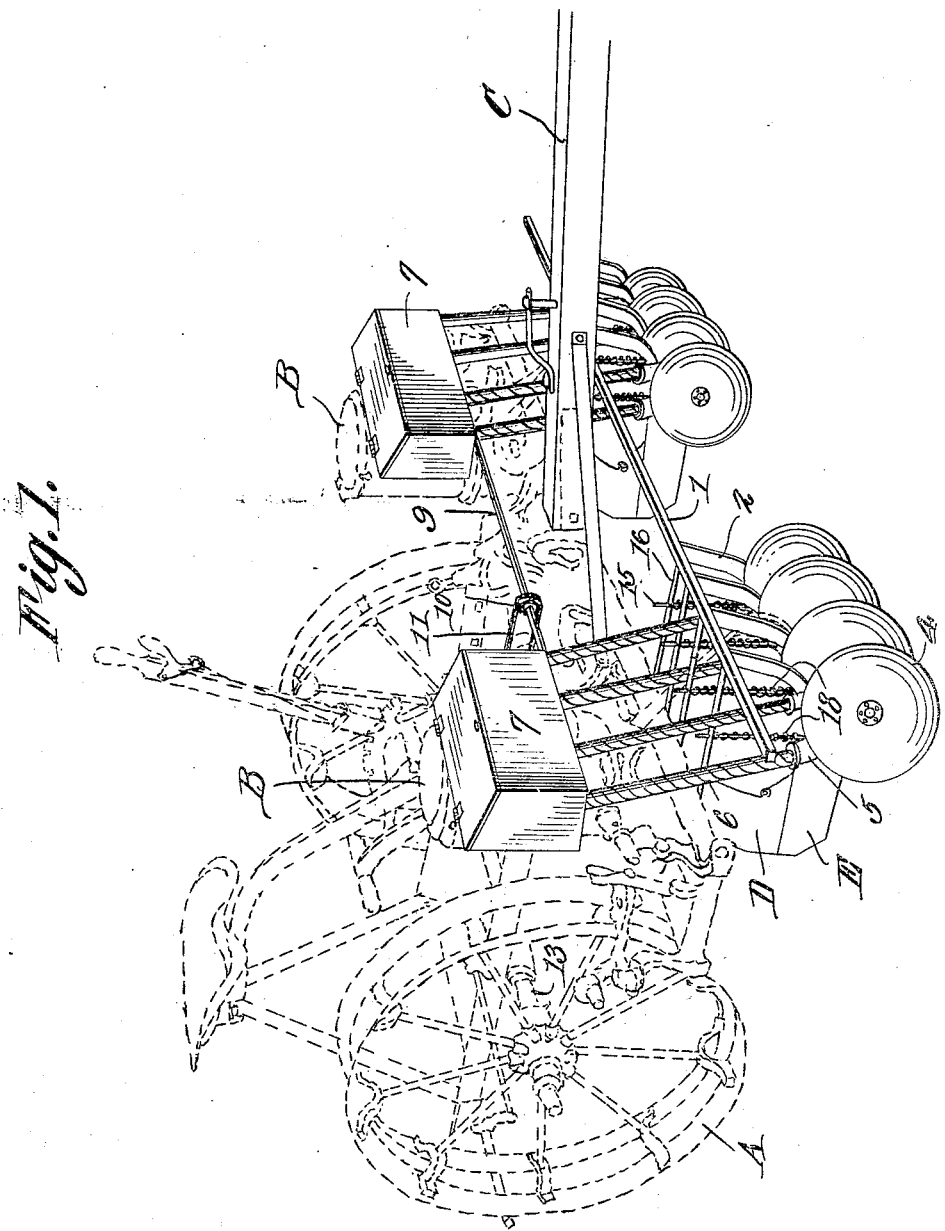
Figure 1 is a perspective view of the attachment in position on a planter, the planter being illustrated by dotted lines.

Referring to the figures by characters of reference A designates a planter having the usual seed box B and a draft tongue C. The boots D of the planter are located as ordinarily, the feet of the boots being indicated at E.

The attachment constituting the present invention includes a cross beam 1 adapted to be fixedly secured to the draft beam C. Depending from this beam 1 at each side of the beam C are standards 2 arranged at equal distances apart and pivotally connected to the lower end of each standard is a block 3 on which a disk 4 is journaled. Formed integral with or secured to this block is a discharge spout 5 arranged close to one side of the disk and adapted to receive fertilizer through a boot 6 from a fertilizer box 7 which extends over the disks, which, as shown, are arranged in groups, one group being located at each side of the beam C. The box 7 may be provided with any suitable dropping mechanism indicated generally at 8 and a transverse shaft 9 is arranged under the two boxes for the purpose of operating the dropping mechanism, this shaft being provided with a gear 10 adapted to receive motion through a chain 11 from the sprocket 12 on the shaft 13 of the seed dropping mechanism of the planter.

The fertilizer boxes are preferably held in position by attaching bands 14 adapted to be secured to the seed boxes B.

Each of the blocks 3 has a rod 15 pivotally connected to it and extending upwardly therefrom, said rod being slidably mounted within a brace rod 16 secured to the cross beam 1. Each brace rod is made up of two sections telescopically connected as shown particularly in Fig. 2, said sections being adjustable relative to each other so as to be attached readily to different types of planters, the rear end of each of these brace rods being secured to the planter frame as shown at 17. A spring 18 is mounted on each of the rods 15 and presses yieldingly on the block 3 above the axis of rotation of the disk 4, thus to press the disk yieldingly against the surface of the ground, block 3 swinging about its pivotal connection 19.

Each group of disks 4 is so located that the center of the space between the two innermost disks of the group will be in line with the foot E of the planting boot D. Thus it will be seen that after the attachment has been secured to a planter said planter can be drawn forwardly and fertilizer will be deposited in shallow furrows produced by the disks 9. These furrows will be spaced apart equal distances (preferably 5 inches) and the seed dropping mechanism will deposit seeds in hills at points midway between the two innermost furrows. Thus the fertilizer will not be deposited in bulk within each hill in which seeds are planted but will, instead, be deposited in drills close to the sides of the hills where the supply of proper nourishment to the seeds is insured without danger of injury to the seeds due to a direct contact with the fertilizer.

Should it be desired to use the planter without the attachment, said attachment can be removed readily, it merely being necessary to detach the rods 15 from the frame of the planter, to detach the beam 1 from the beam C, and to disconnect the attaching bands 14 from the seed boxes.

The springs 18 serve to hold the disks yieldingly against the surface of the ground, it being possible for them to adjust independently of each other thus to pass readily over an uneven surface.

What is claimed is:—

1. A fertilizer distributing attachment for planters, including a transverse beam for attachment to the draft beam of a planter, standards extending therefrom and arranged in groups, furrow opening disks connected to the standards, fertilizer containers, means for directing fertilizer from said containers into the furrows produced by the disks, fertilizer dropping mechanism within each container, and means for coupling said mechanism to the seed dropping mechanism of a planter.

2. A fertilizer distributing attachment for planters, including a transverse beam for attachment to the draft beam of a planter, adjustable braces for connecting said transverse beam to the frame of a planter, standards depending from the transverse beam and arranged in groups, furrow opening disks carried by said standards, fertilizer containers, dropping mechanism therein, means for directing fertilizer from the containers and into the furrows opened by the disks, yielding means for holding the disks pressed against the surface of the ground, said disks being movable independently under the action of said means, and means for coupling the dropping mechanism to the dropping mechanism of a planter.

3. A fertilizer distributing attachment for planters, including a transverse beam, means for connecting said beam to the frame of a planter, a group of standards extending from the beam, furrow opening disks connected to said standards, separate means for holding the respective disks yieldingly against the ground, fertilizer containers, means for directing fertilizers therefrom into the respective furrows, fertilizer dropping mechanism, and means for coupling said mechanism to the dropping mechanism of a planter.

4. The combination with a planter including means for dropping seeds in a row of hills, of means for depositing fertilizer, said means including a group of standards in front of the planting mechanism, furrow opening disks connected to the standards for opening furrows at each side of the row of hills, a fertilizer container, means for directing fertilizer from the container into the respective furrows thereby to deposit the fertilizer in drills along opposite sides of the row of hills, dropping mechanism in the container, and means for transmitting motion to said dropping mechanism from the seed dropping mechanism of the planter.

In testimony that I claim the foregoing as my own, I have hereto affixed my signature in the presence of two witnesses.

GEORGE O. CROSSLAND.

Witnesses:
HAZEL HART,
WAYNE H. MCKILLEN.

Copies of this patent may be obtained for five cents each, by addressing the "Commissioner of Patents, Washington, D. C."